(12) United States Patent
Chen (10) Patent No.: US 6,708,927 B2
(45) Date of Patent: Mar. 23, 2004

(54) APPARATUS FOR SLOWLY AND SAFELY DESCENDING FROM A HIGH-RISE BUILDING

(76) Inventor: Jack Chen, PO Box 82-144, Taipei (TW)

( * ) Notice: Subject to any disclaimer, the term of this patent is extended or adjusted under 35 U.S.C. 154(b) by 384 days.

(21) Appl. No.: 10/156,127
(22) Filed: May 29, 2002

(65) Prior Publication Data

US 2003/0222178 A1 Dec. 4, 2003

(51) Int. Cl.⁷ .............................................. B64O 17/00
(52) U.S. Cl. ..................... 244/143; 244/138 R; 182/230
(58) Field of Search ............................... 244/143, 146, 244/138 R; 182/230, 3

(56) References Cited

U.S. PATENT DOCUMENTS

| 3,921,944 A | * 11/1975 | Morrison ........................ 2/456 |
| 5,058,831 A | * 10/1991 | Takahashi ............... 244/138 R |
| 5,388,786 A | * 2/1995 | Hirose ............................. 182/3 |
| 6,125,478 A | * 10/2000 | Alaloof .......................... 2/456 |

* cited by examiner

Primary Examiner—J. Woodrow Eldred
(74) Attorney, Agent, or Firm—Leong C. Lei (57) ABSTRACT

An apparatus for slowing and safely descending from a high-rise building includes a plurality of independent airbags which are connected together to form an airbag jumpsuit, a harness mounted at sternum and back position on an outside layer of the jumpsuit, a pair of triangular wings each connected to one side of the jumpsuit, a first secondary airbag located at an upper chest portion of the jumpsuit and connected to an air pipe, a second secondary airbag located at a lower abdomen portion of the jumpsuit and connected to an air pipe, and a parachute connected to the harness and having a canopy with a plurality of tubular ribs on an outer layer which are communicated with one another and also filled with air, a top of the parachute having an orifice which is connected to the tubular ribs, a flexible air pipe being connected to a top of the parachute, a top of the parachute having two large holes and two small holes, each of the holes being connected to suspension lines of a small parachute.

3 Claims, 8 Drawing Sheets

APPARATUS FOR SLOWLY AND SAFELY DESCENDING FROM A HIGH-RISE BUILDING

BACKGROUND OF THE INVENTION

1. Field of the Invention

This invention is related to a fire escape apparatus which enables one to descend slowly and safely from a high-rise building.

2. Description of the Prior Art

Generally, in case of fire occurring in high-rise buildings, the fire will burn upwards, and when smoke and fire progresses into fire escape staircases, people in the building cannot use this means of escaping from the fire hazard. Hence, if the escape apparatus in a high-rise building does not work, people will be unable to survive from the high temperatures and smoke caused by the fire. Sometimes they will attempt to jump out of the building, resulting in severe injury or death.

Therefore, it is an object of the present invention to provide an apparatus for slowly and safely descending from a high-rise building which can obviate and mitigate the above-mentioned drawbacks.

SUMMARY OF THE INVENTION

This invention is related to an apparatus for slowly and safely descending from a high-rise building.

It is the primary object of the present invention to provide a fire escape apparatus which enables one to descend slowly and safely from a high-rise building.

It is another object of the present invention to provide an apparatus which enables one to descend from a high-rise building in a gradual descent arcing away from the building.

It is a further object of the present invention to provide an apparatus for slowing and safely descending from a high-rise building includes a plurality of independent airbags which are connected together to form an airbag jumpsuit, a harness mounted at sternum and back position on an outside layer of the jumpsuit a pair of triangular wings each connected to one side of the jumpsuit, a first secondary airbag located at an upper chest portion of the jumpsuit and connected to an air pipe, a second secondary airbag located at a lower abdomen portion of the jumpsuit and connected to an air pipe, and a parachute connected to the harness and having a canopy with a plurality of tubular ribs on an outer layer which are communicated with one another and also filled with air, a top of the parachute having an orifice which is connected to the tubular ribs, a flexible air pipe being connected to a top of the parachute, a top of the parachute having two large holes and two small holes, each of the holes being connected to suspension lines of four small parachutes.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 1A, 2, 6 and 6A, the present invention basically comprises a plurality of independent airbags 11, which are connected together to form an airbag jumpsuit 1. The jumpsuit 1 is composed of the airbags 11. A helmet 12 is connected and fixed on the top of the jumpsuit 1, a visor 13 is mounted on the front side of the helmet 12, a zipper 14 is fixed in the front side of the jumpsuit 1 in order for the user to wear the jumpsuit 1, and an air pipe 10 is connected to the jumpsuit 1 for filling air into the airbags 11.

Figures 1, 1A:
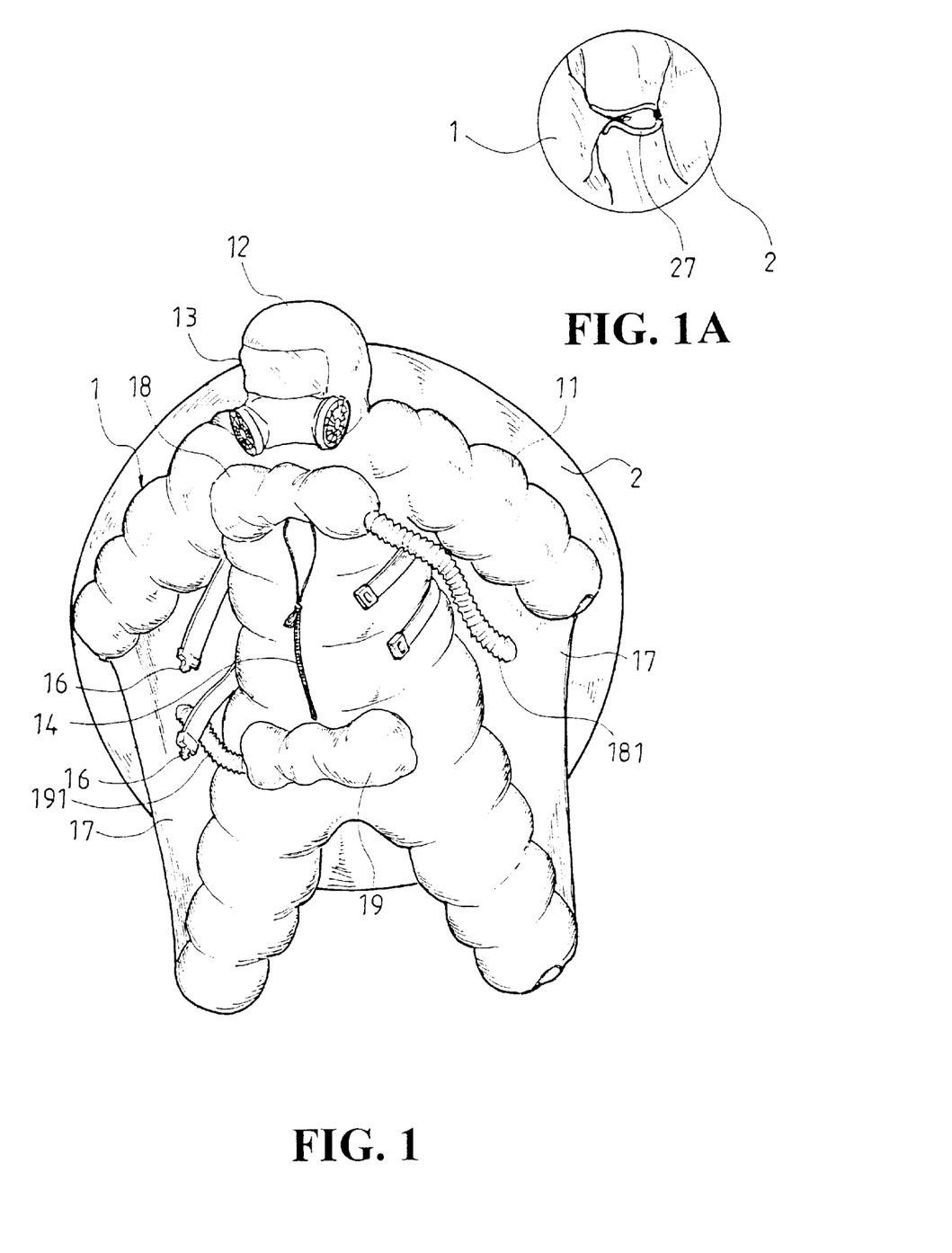
FIG. 1 is a depiction of the inventive airbag jumpsuit.
FIG. 1A is detail of detachable clips holding a folded parachute on the jumpsuit.
Figure 2:
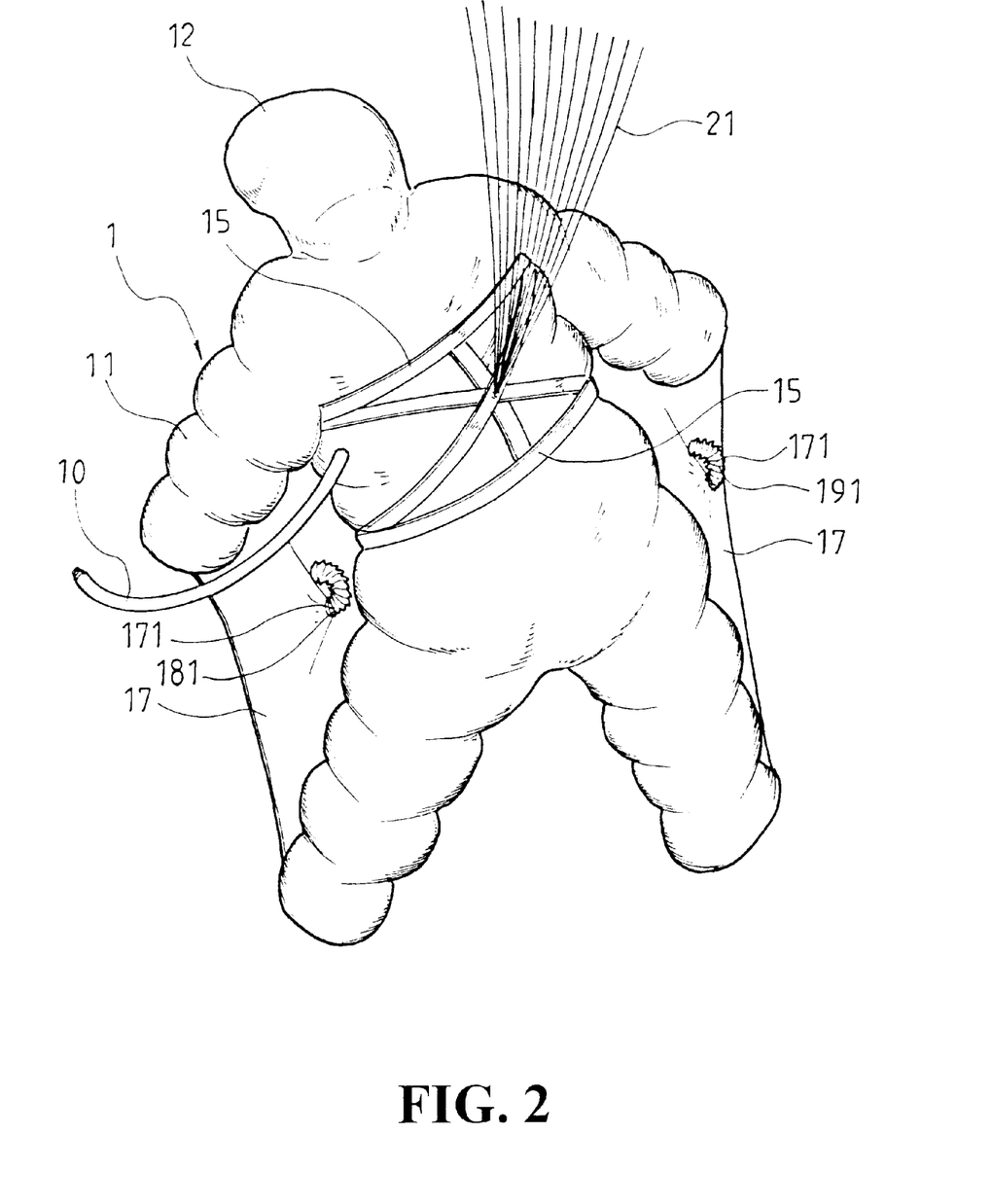
FIG. 2 shows the harness connecting the parachute to the jumpsuit.

A harness 15 is mounted at the sternum and back position on the outside layer of the jumpsuit 1, and has buckles 16 for the user to adjust and keep the harness firmly in place. The back of the harness 15 is connected to a parachute 2. The parachute 2 is folded onto the harness by means of easily detachable clips 27.

A triangular wing 17 is connected to both the right and left sides of the jumpsuit 1, and spans from the wrist to the bottom leg portion of both sides of the jumpsuit 1.

A secondary airbag 18 is located at the upper chest portion of the airbag jumpsuit 1, and another secondary airbag 19 is located at the lower abdomen portion of the jumpsuit 1. The secondary airbags 18 and 19 are connected to air pipes 181 and 191 respectively.

Figure 6:
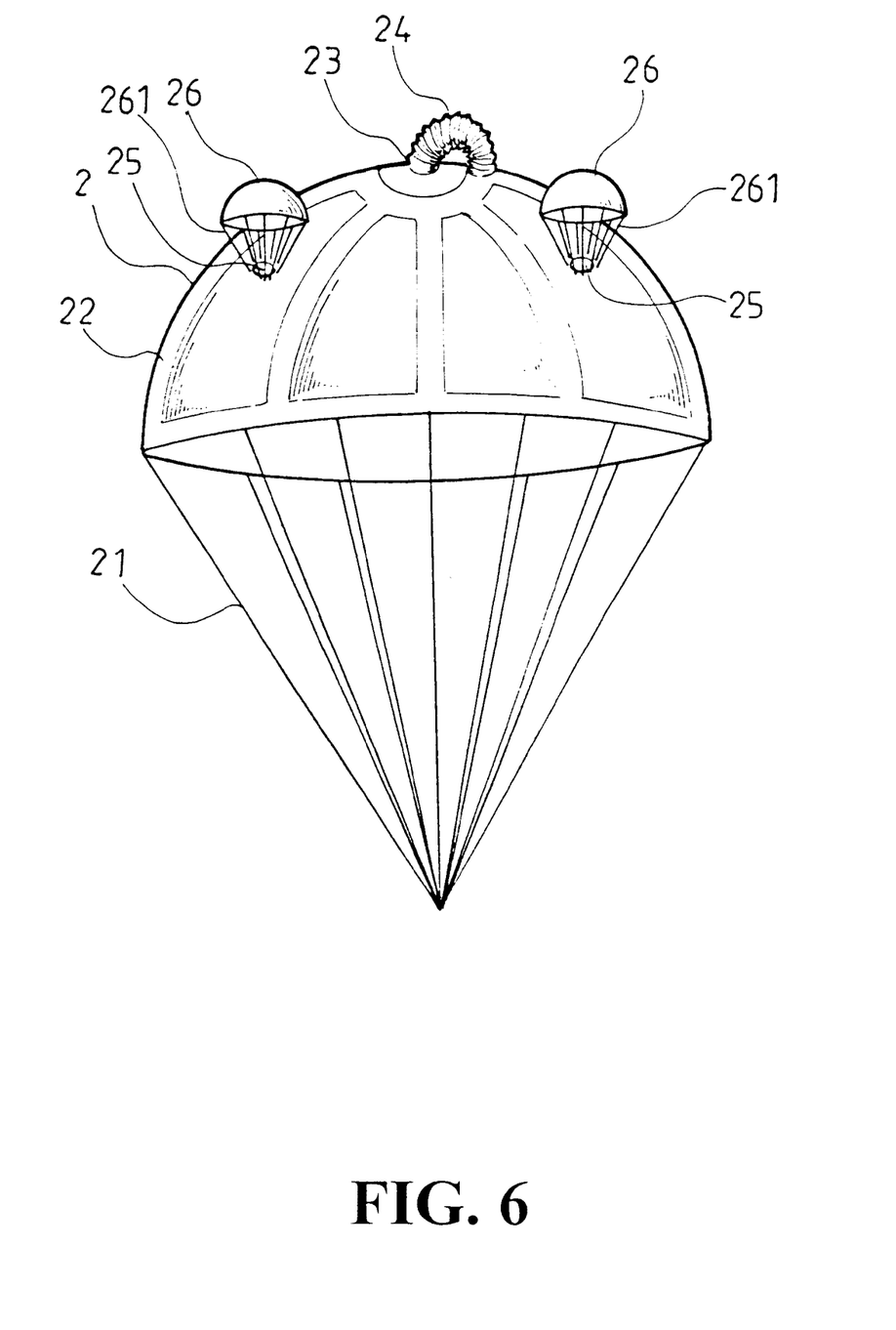
FIGS. 6, 6A, and 7 show the parachute.
Figure 6A:
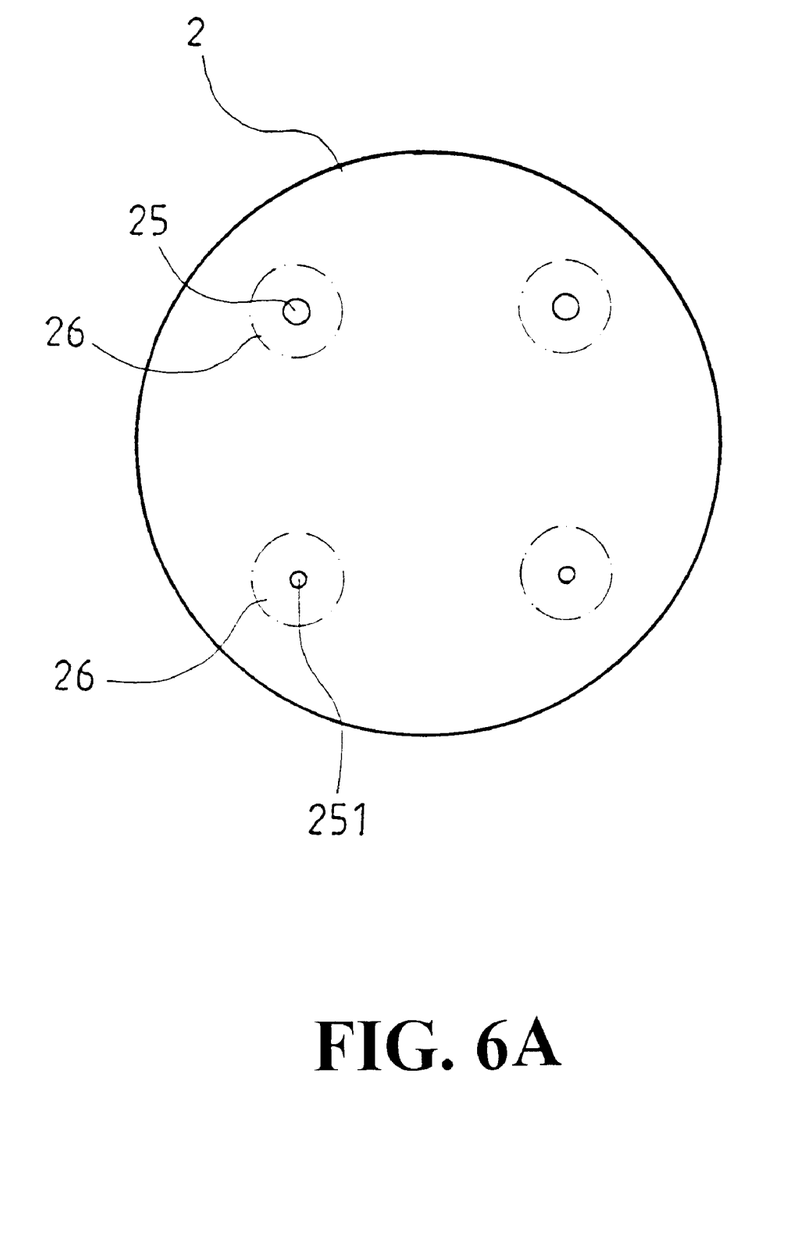

The canopy of the parachute 2 has a plurality of tubular ribs 22 on the outer layer which are connected with one another and also filled with air. The top of the parachute has an orifice 23 which is connected to the tubular ribs 22. A flexible air pipe 24 is connected to the top of the parachute 2.

The top of the parachute 2 has two large holes 25 and two small holes 251. Each of the holes 25 and 251 is connected to the suspension lines 261 of a small parachute 26.

When in use, the user will put on the jumpsuit 1 and fasten the buckles 16. Air is then filled into the airbags 11 through the air pipe 10 and then the user can jump from the high-rise building and the wind will make the clips 27 detach and the parachute open. As the user jumps down, the secondary airbags 18 and 19 will be filled with air, thus protecting the user completely.

Figure 3:
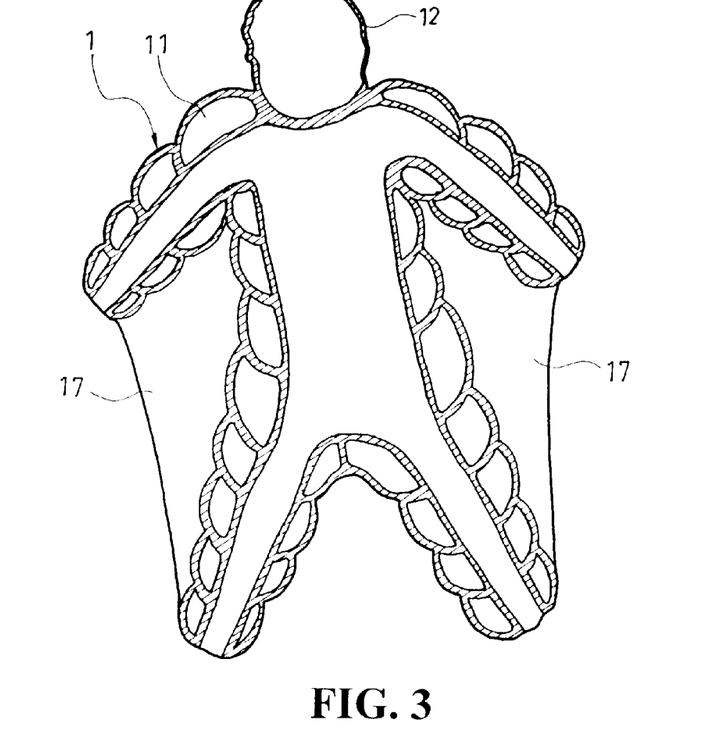
FIGS. 3 and 4 show the independent airbags forming the jumpsuit.
Figure 4:
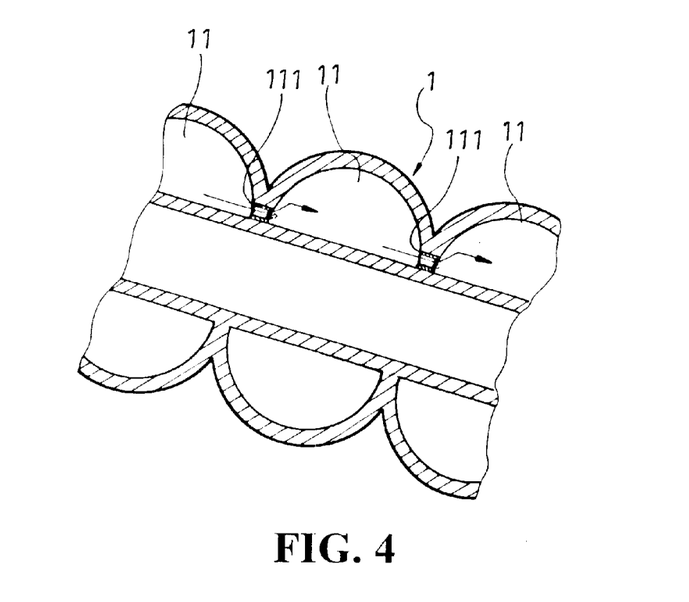

Looking now at FIGS. 3 and 4, the jumpsuit 1 is composed of a plurality of independent airbags 11, each of which is provided with a check valve 111, so that the airbags will be filled with air in sequence. Furthermore, even if any one of the airbags is broken, it will not affect the other airbags.

Figure 5:
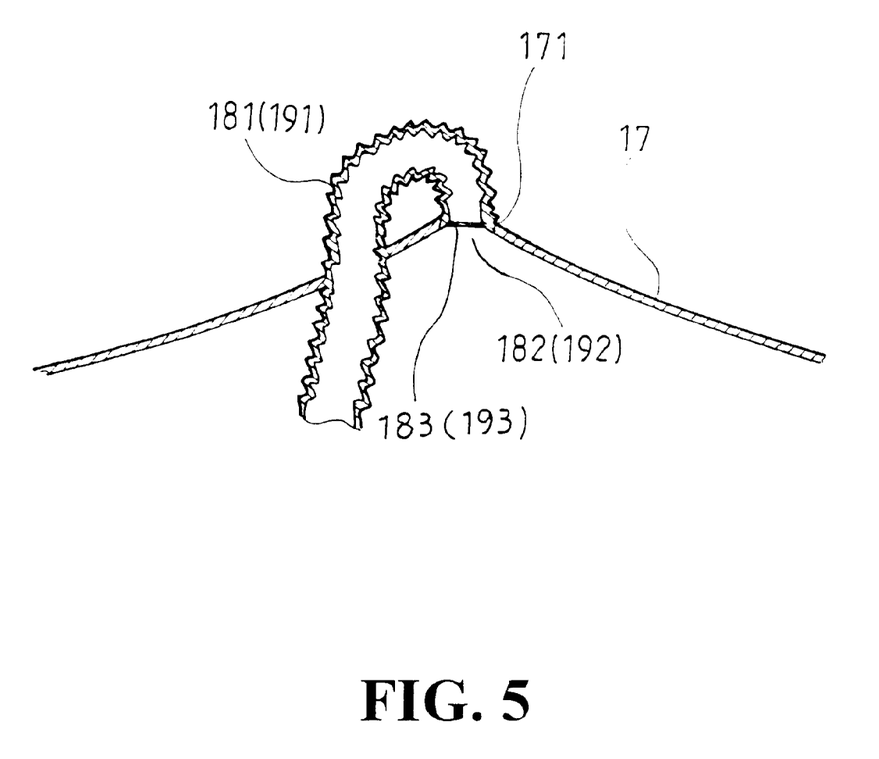
FIG. 5 shows an orifice and air pipe which serves to inflate the airbags.

Referring to FIG. 5, the two wings 17 have two wing tips 171 which are connected with to pipes 181 and 191. At the wing tips 171 there are orifices 182 and 192 from which air pipes 181 and 191 extend first upwards then downwards through the wings 17 to connect with the secondary airbags 18 and 19, respectively. As the user jumps downwards, air will pass through the orifices 182 and 192 and through the air pipes 181 and 191 into the secondary airbags 18 and 19.

Figure 7:
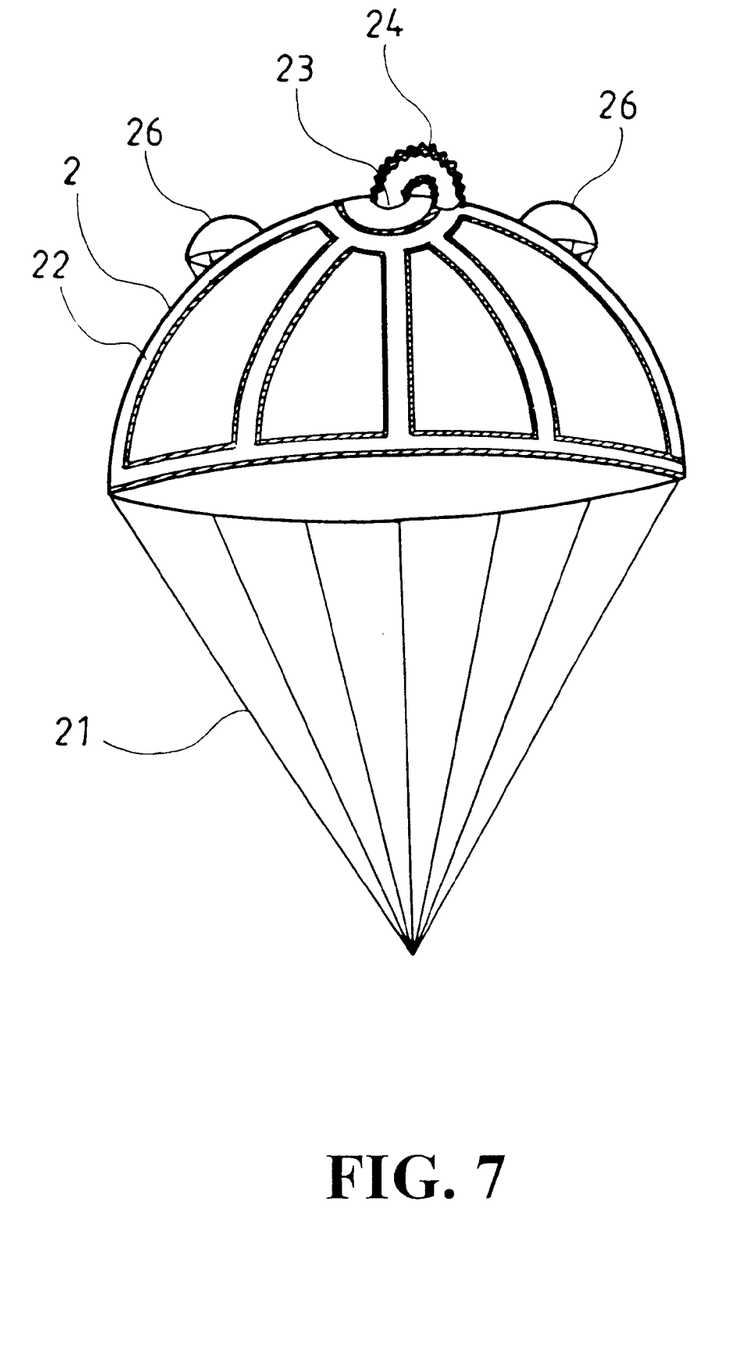
Figure 8:
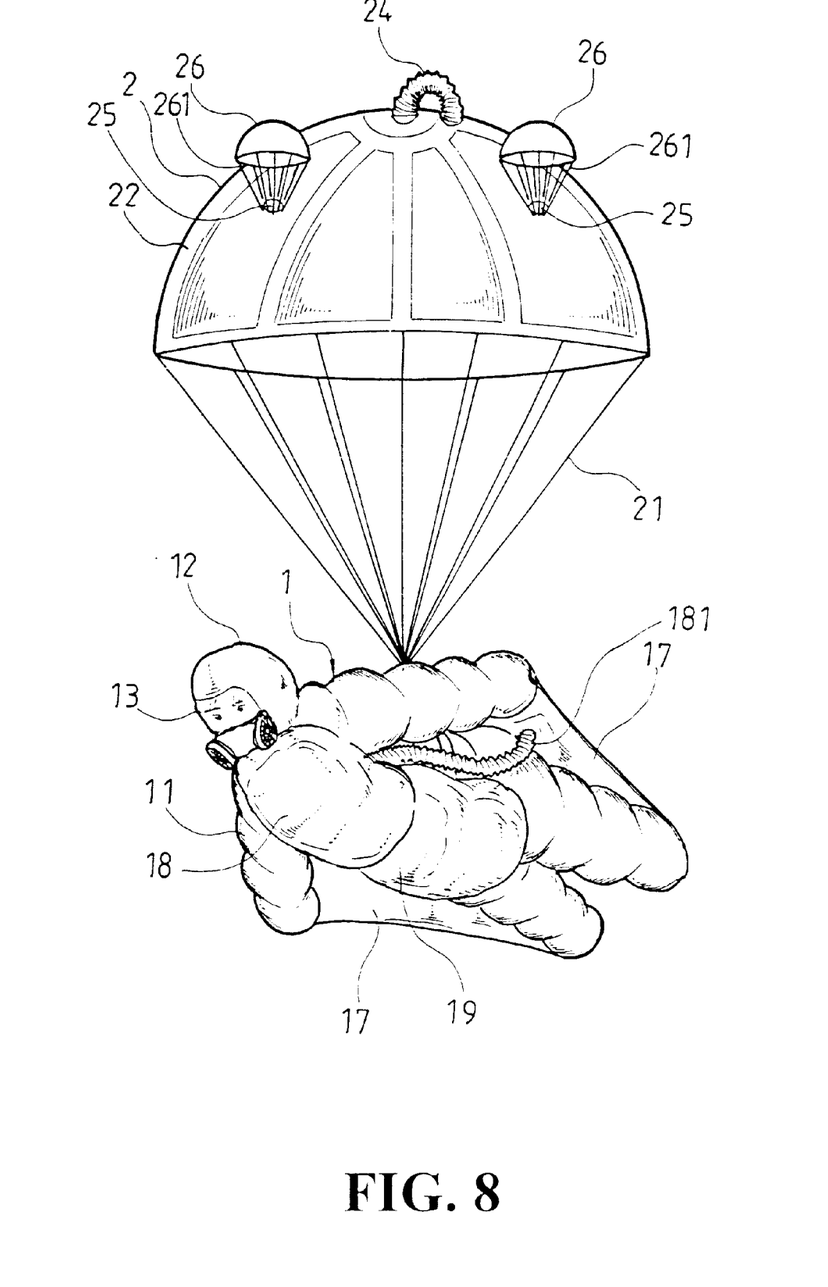
FIG. 8 shows the suit in use with the parachute deployed.

Referring to FIGS. 6A, 7 and 8, the canopy of the parachute 2 has a plurality of tubular ribs 22 on the outer layer which are also filled with air. The top of the parachute has an orifice 23 which is connected to the tubular ribs 22. A flexible air pipe 24 is connected to the top of the parachute canopy. The top of the parachute 2 has two large holes 25 and two small holes 251. Each of the holes 25 and 251 is connected to the suspension lines 261 of a small parachute 26. The large parachute 2 and the four small parachutes 26 will enable the jumper to descend from the building in a gradual descent arcing away from the building.

Before use, the escaper will have the mobility to walk to the place of jumping when wearing the jumpsuit. Once at the location for jumping, the jumper will then fill the jumpsuit with air and can then commence descent.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An apparatus for slowing and safely descending from a high-rise building comprising:

a plurality of independent airbags which are connected together to form an airbag jumpsuit, a helmet connected and fixed on a top of said jumpsuit, a visor mounted on a front side of said helmet, a zipper fixed in the front side of the jumpsuit in order for a user to wear said jumpsuit, and an air pipe connected to said jumpsuit for filling air into said airbags;

a harness mounted at sternum and back position on an outside layer of said jumpsuit;

a pair of triangular wings each connected to one side of said jumpsuit;

a first secondary airbag located at an upper chest portion of said jumpsuit and connected to an air pipe;

a second secondary airbag located at a lower abdomen portion of said jumpsuit and connected to an air pipe; and a parachute connected to said harness and having a canopy with a plurality of tubular ribs on an outer layer which are communicated with one another and also filled with air, a top of said parachute having an orifice which is connected to said tubular ribs, a flexible air pipe being connected to a top of said parachute, a top of said parachute having two large holes and two small holes, each of said holes being connected to suspension lines of a small parachute.

2. The apparatus for slowing and safely descending from a high-rise building as claimed in claim 1, wherein said harness is provided with buckles.

3. The apparatus for slowing and safely descending from a high-rise building as claimed in claim 1, wherein said airbags are each provided with a check valve.

* * * * *